US012568522B2

(12) United States Patent
Ozturk et al.

(10) Patent No.: US 12,568,522 B2
(45) Date of Patent: Mar. 3, 2026

(54) DYNAMIC COMPONENT CARRIER CONFIGURATION FOR UPLINK CONFIGURED GRANTS

(71) Applicant: QUALCOMM Incorporated, San Diego, CA (US)

(72) Inventors: Ozcan Ozturk, San Diego, CA (US); Sherif Elazzouni, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 677 days.

(21) Appl. No.: 18/049,869

(22) Filed: Oct. 26, 2022

(65) Prior Publication Data

US 2023/0128119 A1    Apr. 27, 2023

Related U.S. Application Data

(60) Provisional application No. 63/263,127, filed on Oct. 27, 2021.

(51) Int. Cl.
*H04W 24/10*          (2009.01)
*H04L 1/1812*          (2023.01)
(Continued)

(52) U.S. Cl.
CPC ......... *H04W 72/569* (2023.01); *H04L 1/1812* (2013.01); *H04W 72/23* (2023.01)

(58) Field of Classification Search
CPC ............... H04W 72/569; H04W 72/23; H04W 72/0453; H04W 72/115; H04L 1/1812
See application file for complete search history.

(56) References Cited

U.S. PATENT DOCUMENTS

2007/0220305 A1*   9/2007   Isoyama ............. G06F 11/2023
                                                                    714/E11.073
2021/0045181 A1     2/2021   Li et al.
                          (Continued)

FOREIGN PATENT DOCUMENTS

WO          2020033895 A1      2/2020
WO          2021031743 A1      2/2021

OTHER PUBLICATIONS

Qualcomm Incorporated: "RAN Enhancements to Support Survival Time QoS", 3GPP TSG-RAN WG2 Meeting #116e, R2-2109927, 5 Pages, Oct. 22, 2021 (Oct. 22, 2021) (Year: 2021).*
(Continued)

*Primary Examiner* — Lan-Huong Truong
(74) *Attorney, Agent, or Firm* — Paul M. McAdams; Harrity & Harrity, LLP

(57)                ABSTRACT

Various aspects of the present disclosure generally relate to wireless communication. In some aspects, a user equipment (UE) may receive an indication of a priority rule for prioritizing overlapping configured grant opportunities associated with a periodic data transmission, wherein the overlapping configured grant opportunities are associated with component carriers having a same logical channel priority, wherein the priority rule indicates a priority of a first component carrier associated with a first configured grant opportunity, of the overlapping configured grant opportunities, relative to a priority of a second component carrier associated with a second configured grant opportunity, of the overlapping configured grant opportunities, based at least in part on whether the UE is associated with a survival state. The UE may transmit the periodic data transmission according to the overlapping configured grant opportunities based at least in part on the priority rule. Numerous other aspects are described.

30 Claims, 11 Drawing Sheets

800 ⟶

```
┌──────────────────────────────────────────────────────────┐
│    Receive an indication of a priority rule for prioritizing overlapping  │
│     configured grant opportunities associated with a periodic data        │
│   transmission, wherein the overlapping configured grant opportunities    │
│      are associated with component carriers having a same logical         │
│    channel priority, wherein the priority rule indicates a priority of a first │
│ 810 ∿     component carrier associated with a first configured grant       │
│   opportunity, of the overlapping configured grant opportunities, relative │
│    to a priority of a second component carrier associated with a second    │
│       configured grant opportunity, of the overlapping configured grant    │
│   opportunities, based at least in part on whether the UE is associated    │
│                          with a survival state                            │
└──────────────────────────────────────────────────────────┘
                                  │
                                  ▼
┌──────────────────────────────────────────────────────────┐
│    Transmit the periodic data transmission according to the overlapping   │
│ 820 ∿  configured grant opportunities based at least in part on the priority │
│                                rule                                        │
└──────────────────────────────────────────────────────────┘
```

(51) Int. Cl.
H04W 72/23 (2023.01)
H04W 72/566 (2023.01)

(56) References Cited

U.S. PATENT DOCUMENTS

| 2021/0227575 A1 | 7/2021 | Ou et al. | |
| 2021/0259040 A1 | 8/2021 | Babaei | |
| 2023/0015859 A1* | 1/2023 | Tseng | H04W 74/0875 |
| 2023/0344604 A1* | 10/2023 | Huang | H04W 72/1268 |

OTHER PUBLICATIONS

Interdigital: "Enhancements based on New QoS Requirements", 3GPP RAN WG2 Meeting #116-e, R2-2110913, 4 Pages, Oct. 22, 2021 (Oct. 22, 2021). (Year: 2021).*
CMCC: "Discussion on the RAN support for new QoS parameters", 3GPP TSG-RAN WG2 #113 electronic, R2-2108516, 3 pages, Aug. 2021 (Year: 2021).*
CMCC: "Discussion on the RAN Support for New QoS Parameters", 3GPP TSG-RAN WG2 #115 electronic, R2-2108516, 3rd Generation Partnership Project (3GPP), Mobile Competence Centre, 650, Route Des Lucioles, F-06921 Sophia-Antipolis Cedex, France, vol. RAN WG2, No. Electronic, Online, Aug. 1, 2021, 4 Pages, Aug. 6, 2021 (Aug. 6, 2021), XP052034856, Section 2, p. 1-p. 3.
Interdigital: "Enhancements based on New QoS Requirements", 3GPP RAN WG2 Meeting #116-e, R2-2110913, 3rd Generation Partnership Project (3GPP), Mobile Competence Centre, 650, Route Des Lucioles, F-06921 Sophia-Antipolis Cedex, France, vol. RAN WG2, No. eMeeting, Nov. 1, 2021-Nov. 12, 2021, 4 Pages, Oct. 22, 2021 (Oct. 22, 2021), XP052067352, Sections 2.1 and 2.2, p. 2-p. 3.
International Search Report and Written Opinion—PCT/US2022/078748—ISA/EPO—Feb. 8, 2023.
Qualcomm Incorporated: "RAN Enhancements to Support Survival Time QoS", 3GPP TSG-RAN WG2 Meeting #116e, R2-2109927, 3rd Generation Partnership Project (3GPP), Mobile Competence Centre, 650, Route Des Lucioles, F-06921 Sophia-Antipolis Cedex, France, vol. RAN WG2, No. Electronic, Nov. 1, 2021-Nov. 11, 2021, 5 Pages, Oct. 22, 2021 (Oct. 22, 2021), XP052066381, Sections 2 and 3, p. 1-p. 3.

* cited by examiner

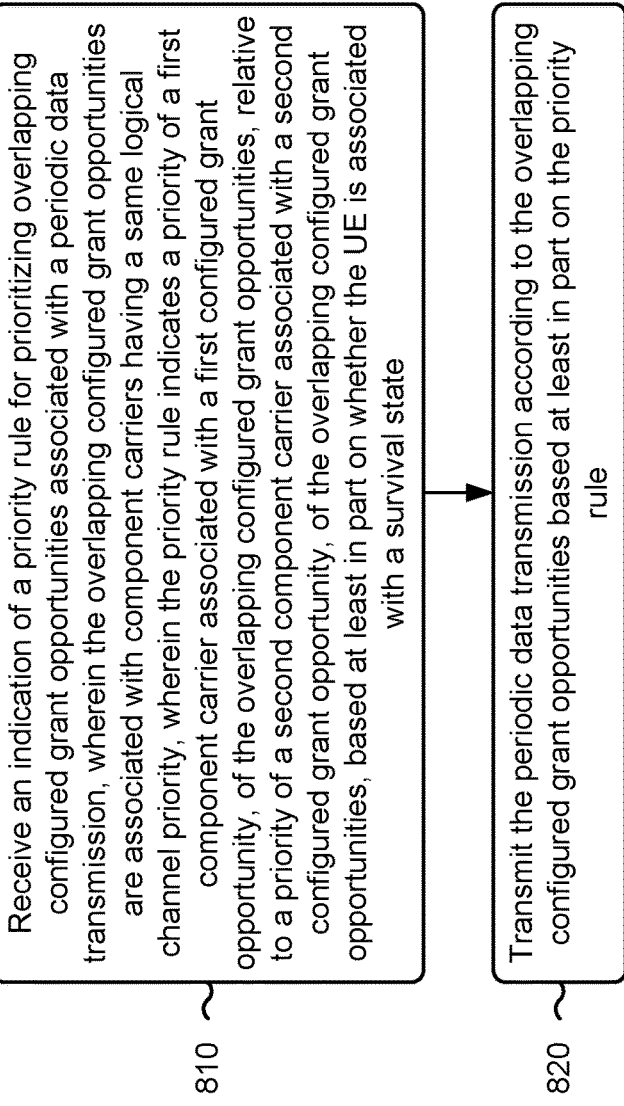

810 Receive an indication of a priority rule for prioritizing overlapping configured grant opportunities associated with a periodic data transmission, wherein the overlapping configured grant opportunities are associated with component carriers having a same logical channel priority, wherein the priority rule indicates a priority of a first component carrier associated with a first configured grant opportunity, of the overlapping configured grant opportunities, relative to a priority of a second component carrier associated with a second configured grant opportunity, of the overlapping configured grant opportunities, based at least in part on whether the UE is associated with a survival state 820 Transmit the periodic data transmission according to the overlapping configured grant opportunities based at least in part on the priority rule

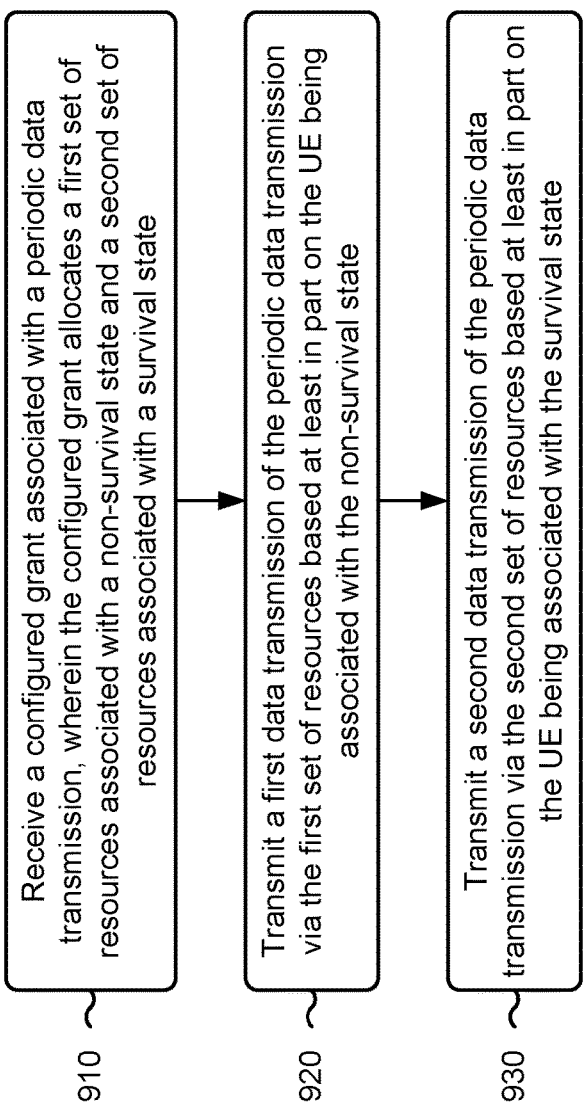

900

910 Receive a configured grant associated with a periodic data transmission, wherein the configured grant allocates a first set of resources associated with a non-survival state and a second set of resources associated with a survival state 920 Transmit a first data transmission of the periodic data transmission via the first set of resources based at least in part on the UE being associated with the non-survival state 930 Transmit a second data transmission of the periodic data transmission via the second set of resources based at least in part on the UE being associated with the survival state

FIG. 9

DYNAMIC COMPONENT CARRIER CONFIGURATION FOR UPLINK CONFIGURED GRANTS

CROSS-REFERENCE TO RELATED APPLICATION

This patent application claims priority to U.S. Provisional Patent Application No. 63/263,127, filed on Oct. 27, 2021, entitled "DYNAMIC COMPONENT CARRIERS CON-FIGURATION FOR UPLINK CONFIGURED GRANTS," and assigned to the assignee hereof. The disclosure of this prior Provisional Application is considered part of and is incorporated by reference into this patent application in its entirety.

FIELD OF THE DISCLOSURE

Aspects of the present disclosure generally relate to wireless communication and to techniques and apparatuses for dynamic component carrier configuration for uplink configured grants.

BACKGROUND

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division syn-chronous code division multiple access (TD-SCDMA) sys-tems, and Long Term Evolution (LTE). LTE/LTE-Advanced is a set of enhancements to the Universal Mobile Telecom-munications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to commu-nicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of a priority rule for prioritizing configured grant opportunities associated with a periodic data transmission, wherein the configured grant opportunities overlap in a time domain and are associated with component carriers having a same logi-cal channel priority, wherein the priority rule indicates a first priority of a first component carrier associated with a first configured grant opportunity, of the configured grant oppor-tunities, relative to a second priority of a second component carrier associated with a second configured grant opportu-nity, of the configured grant opportunities, wherein the priority rule is based at least in part on whether the UE is associated with a survival state, and wherein the survival state is associated with an unsuccessful reception of the periodic data transmission. The method may include trans-mitting the periodic data transmission using at least one of the first configured grant opportunity or the second config-ured grant opportunity based at least in part on the priority rule.

Some aspects described herein relate to a method of wireless communication performed by a UE. The method may include receiving a configured grant associated with a periodic data transmission, wherein the configured grant allocates a first set of resources associated with a non-survival state and a second set of resources associated with a survival state, wherein the non-survival state is associated with successful reception of the configured grant and the survival state is associated with unsuccessful reception of the configured grant. The method may include transmitting a first data transmission of the periodic data transmission via the first set of resources based at least in part on the UE being associated with the non-survival state. The method may include transmitting a second data transmission of the periodic data transmission via the second set of resources based at least in part on the UE being associated with the survival state.

Some aspects described herein relate to a UE for wireless communication. The UE may include a memory and one or more processors coupled to the memory. The one or more processors may be configured to receive an indication of a priority rule for prioritizing configured grant opportunities associated with a periodic data transmission, wherein the configured grant opportunities overlap in a time domain and are associated with component carriers having a same logi-cal channel priority, wherein the priority rule indicates a first priority of a first component carrier associated with a first configured grant opportunity, of the configured grant oppor-tunities, relative to a second priority of a second component carrier associated with a second configured grant opportu-nity, of the configured grant opportunities, wherein the priority rule is based at least in part on whether the UE is associated with a survival state, and wherein the survival state is associated with an unsuccessful reception of the periodic data transmission. The one or more processors may be configured to transmit the periodic data transmission using at least one of the first configured grant opportunity or the second configured grant opportunity based at least in part on the priority rule.

Some aspects described herein relate to a UE for wireless communication. The UE may include a memory and one or more processors coupled to the memory. The one or more processors may be configured to receive a configured grant associated with a periodic data transmission, wherein the configured grant allocates a first set of resources associated with a non-survival state and a second set of resources associated with a survival state, wherein the non-survival state is associated with successful reception of the configured grant and the survival state is associated with unsuccessful reception of the configured grant. The one or more processors may be configured to transmit a first data transmission of the periodic data transmission via the first set of resources based at least in part on the UE being associated with the non-survival state. The one or more processors may be configured to transmit a second data transmission of the periodic data transmission via the second set of resources based at least in part on the UE being associated with the survival state.

Some aspects described herein relate to a non-transitory computer-readable medium that stores a set of instructions for wireless communication by a UE. The set of instructions, when executed by one or more processors of the UE, may cause the UE to receive an indication of a priority rule for prioritizing configured grant opportunities associated with a periodic data transmission, wherein the configured grant opportunities overlap in a time domain and are associated with component carriers having a same logical channel priority, wherein the priority rule indicates a first priority of a first component carrier associated with a first configured grant opportunity, of the configured grant opportunities, relative to a second priority of a second component carrier associated with a second configured grant opportunity, of the configured grant opportunities, wherein the priority rule is based at least in part on whether the UE is associated with a survival state, and wherein the survival state is associated with an unsuccessful reception of the periodic data transmission. The set of instructions, when executed by one or more processors of the UE, may cause the UE to transmit the periodic data transmission using at least one of the first configured grant opportunity or the second configured grant opportunity based at least in part on the priority rule.

Some aspects described herein relate to a non-transitory computer-readable medium that stores a set of instructions for wireless communication by one or more instructions that, when executed by one or more processors the UE, may cause the UE to receive a configured grant associated with a periodic data transmission, wherein the configured grant allocates a first set of resources associated with a non-survival state and a second set of resources associated with a survival state, wherein the non-survival state is associated with successful reception of the configured grant and the survival state is associated with unsuccessful reception of the configured grant. The set of instructions, when executed by one or more processors of the UE, may cause the UE to transmit a first data transmission of the periodic data transmission via the first set of resources based at least in part on the UE being associated with the non-survival state. The set of instructions, when executed by one or more processors of the UE, may cause the UE to transmit a second data transmission of the periodic data transmission via the second set of resources based at least in part on the UE being associated with the survival state.

Some aspects described herein relate to an apparatus for wireless communication. The apparatus may include means for receiving an indication of a priority rule for prioritizing configured grant opportunities associated with a periodic data transmission, wherein the configured grant opportunities overlap in a time domain and are associated with component carriers having a same logical channel priority, wherein the priority rule indicates a first priority of a first component carrier associated with a first configured grant opportunity, of the configured grant opportunities, relative to a second priority of a second component carrier associated with a second configured grant opportunity, of the configured grant opportunities, wherein the priority rule is based at least in part on whether the apparatus is associated with a survival state, and wherein the survival state is associated with an unsuccessful reception of the periodic data transmission. The apparatus may include means for transmitting the periodic data transmission using at least one of the first configured grant opportunity or the second configured grant opportunity based at least in part on the priority rule.

Some aspects described herein relate to an apparatus for wireless communication. The apparatus may include means for receiving a configured grant associated with a periodic data transmission, wherein the configured grant allocates a first set of resources associated with a non-survival state and a second set of resources associated with a survival state, wherein the non-survival state is associated with successful reception of the configured grant and the survival state is associated with unsuccessful reception of the configured grant. The apparatus may include means for transmitting a first data transmission of the periodic data transmission via the first set of resources based at least in part on the apparatus being associated with the non-survival state. The apparatus may include means for transmitting a second data transmission of the periodic data transmission via the second set of resources based at least in part on the apparatus being associated with the survival state.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are diagrams illustrating example processes associated with dynamic component carrier configuration for uplink configured grants, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
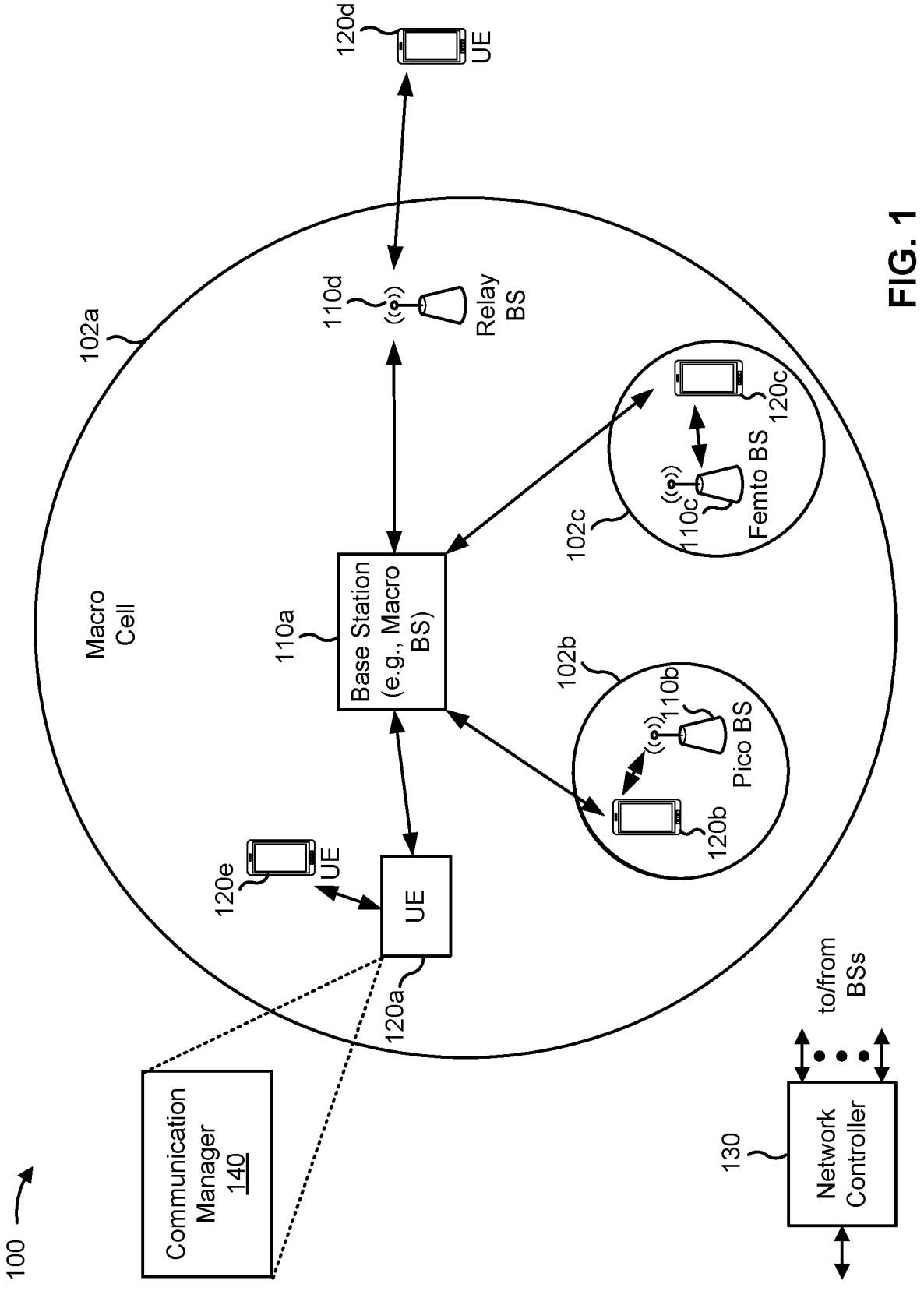
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with dynamic component carriers configuration for uplink configured grants. Additionally, or alternatively, the communication manager 140 may perform one or more other operations described herein.

As indicated above, FIG. 1 is provided as an example. Other examples may differ from what is described with regard to FIG. 1.

Figure 2:
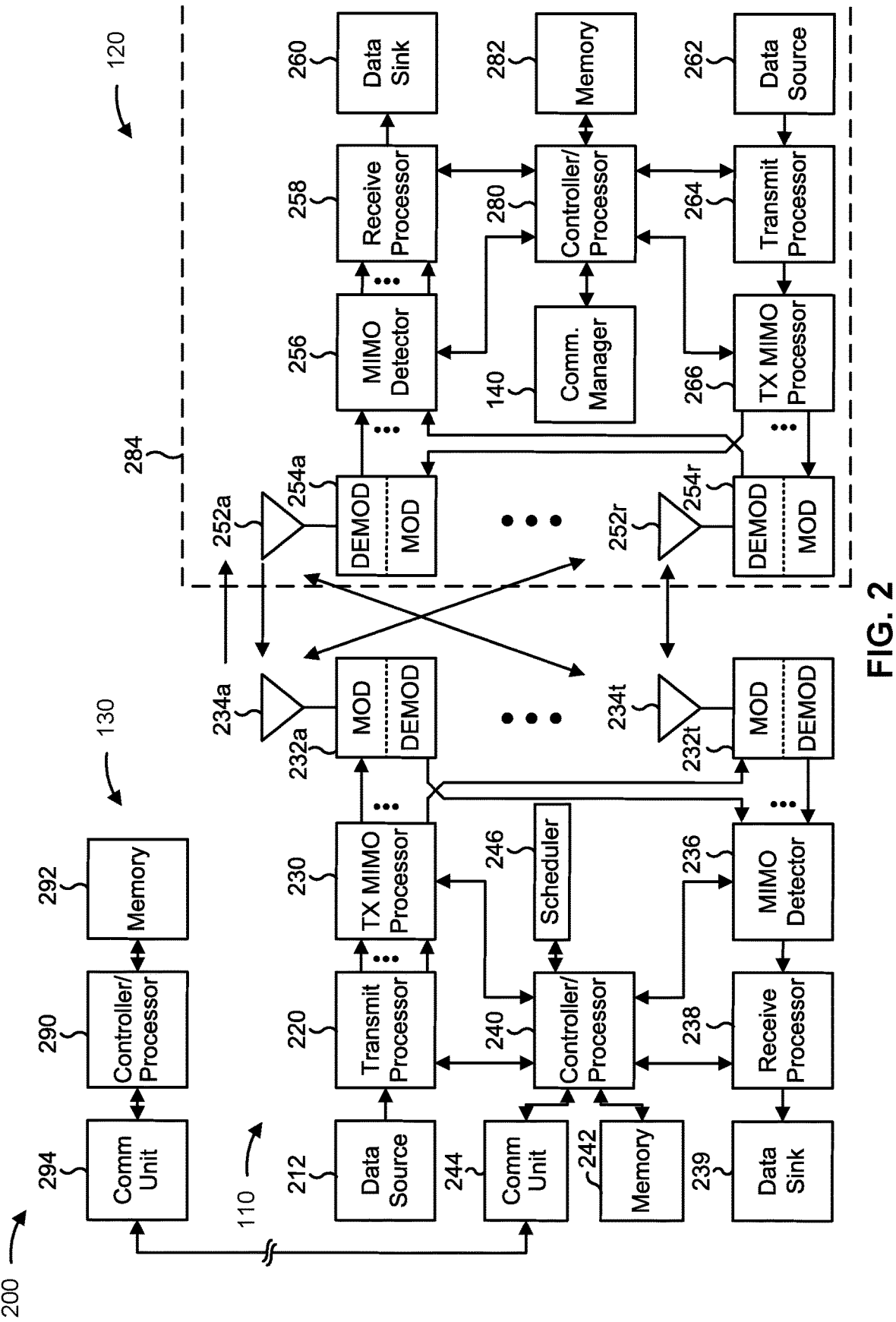
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems

254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with dynamic component carriers configuration for uplink configured grants, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/ or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for receiving an indication of a priority rule for prioritizing overlapping configured grant opportunities associated with a periodic data transmission, wherein the overlapping configured grant opportunities are associated with component carriers having a same logical channel priority, wherein the priority rule indicates a priority of a first component carrier associated with a first configured grant opportunity, of the overlapping configured grant opportunities, relative to a priority of a second component carrier associated with a second configured grant opportunity, of the overlapping configured grant opportunities, based at least in part on whether the UE is associated with a survival state; and/or means for transmitting the periodic data transmission according to the overlapping configured grant opportunities based at least in part on the priority rule. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving a configured grant associated with a periodic data transmission, wherein the configured grant allocates a first set of resources associated with a non-survival state and a second set of resources associated with a survival state; means for transmitting a first data transmission of the periodic data transmission via the first set of resources based at least in part on the UE being associated with the non-survival state; and/or means for transmitting a second data transmission of the periodic data transmission via the second set of resources based at least in part on the UE being associated with the survival state. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
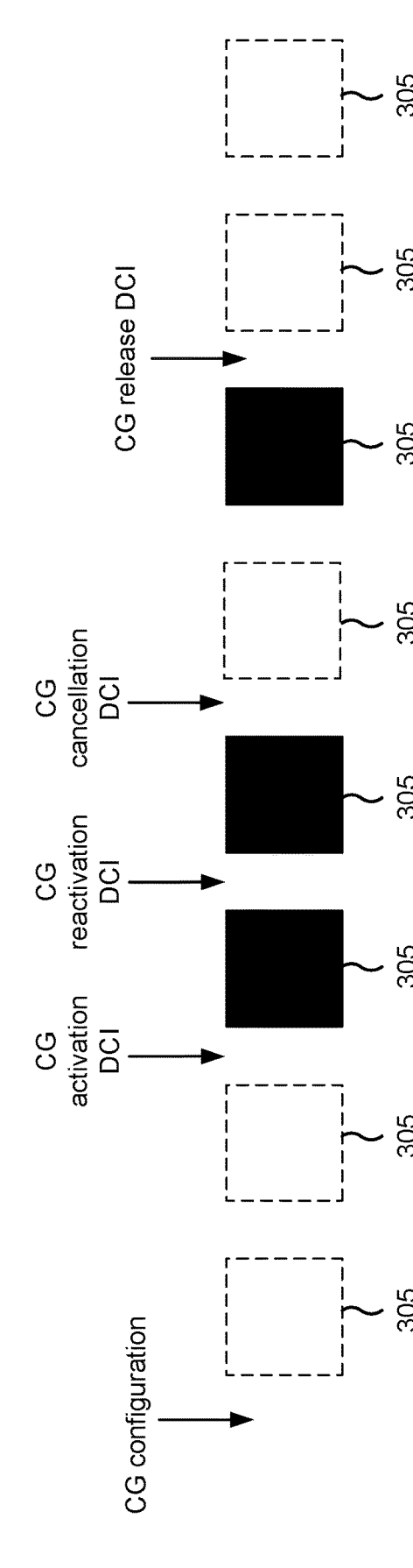
FIG. 3 is a diagram illustrating an example of uplink configured grant communication, in accordance with the present disclosure.

FIG. 3 is a diagram illustrating an example 300 of uplink configured grant (CG) communication, in accordance with the present disclosure. CG communications may include periodic uplink communications that are configured for a UE, such that the base station does not need to send separate downlink control information (DCI) to schedule each uplink communication, thereby conserving signaling overhead.

As shown in example 300, a UE may be configured with a CG configuration for CG communications. For example, the UE may receive the CG configuration via a radio resource control (RRC) message transmitted by a base station. The CG configuration may indicate a resource allocation associated with CG uplink communications (e.g., in a time domain, a frequency domain, a spatial domain, and/or a code domain) and a periodicity at which the resource allocation is repeated, resulting in periodically reoccurring scheduled CG occasions 305 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The base station may transmit CG activation DCI to the UE to activate the CG configuration for the UE. The base station may indicate, in the CG activation DCI, communication parameters, such as an MCS, a resource block (RB) allocation, and/or antenna ports, for the CG physical uplink shared channel (PUSCH) communications to be transmitted in the scheduled CG occasions 305. The UE may begin transmitting in the CG occasions 305 based at least in part on receiving the CG activation DCI. For example, beginning with a next scheduled CG occasion 305 subsequent to receiving the CG activation DCI, the UE may transmit a PUSCH communication in the scheduled CG occasions 305 using the communication parameters indicated in the CG activation DCI. The UE may refrain from transmitting in configured CG occasions 305 prior to receiving the CG activation DCI.

The base station may transmit CG reactivation DCI to the UE to change the communication parameters for the CG PUSCH communications. Based at least in part on receiving the CG reactivation DCI, the UE may begin transmitting in the scheduled CG occasions 305 using the communication parameters indicated in the CG reactivation DCI. For example, beginning with a next scheduled CG occasion 305 subsequent to receiving the CG reactivation DCI, the UE may transmit PUSCH communications in the scheduled CG occasions 305 based at least in part on the communication parameters indicated in the CG reactivation DCI.

In some cases, such as when the base station needs to override a scheduled CG communication for a higher priority communication, the base station may transmit CG cancellation DCI to the UE to temporarily cancel or deactivate one or more subsequent CG occasions 305 for the UE. The CG cancellation DCI may deactivate only a subsequent one CG occasion 305 or a subsequent N CG occasions 305 (where N is an integer). CG occasions 305 after the one or more (e.g., N) CG occasions 305 subsequent to the CG cancellation DCI may remain activated. Based at least in part on receiving the CG cancellation DCI, the UE may refrain from transmitting in the one or more (e.g., N) CG occasions 305 subsequent to receiving the CG cancellation DCI. As shown in example 300, the CG cancellation DCI cancels one subsequent CG occasion 305 for the UE. After the CG occasion 305 (or N CG occasions) subsequent to receiving the CG cancellation DCI, the UE may automatically resume transmission in the scheduled CG occasions 305.

The base station may transmit CG release DCI to the UE to deactivate the CG configuration for the UE. The UE may stop transmitting in the scheduled CG occasions 305 based at least in part on receiving the CG release DCI. For example, the UE may refrain from transmitting in any scheduled CG occasions 305 until another CG activation DCI is received from the base station. Whereas the CG cancellation DCI may deactivate only a subsequent one CG occasion 305 or a subsequent N CG occasions 305, the CG release DCI deactivates all subsequent CG occasions 305 for a given CG configuration for the UE until the given CG configuration is activated again by a new CG activation DCI.

In some cases, the base station may determine a communication service availability parameter and/or a survival time associated with a periodic data transmission to be transmitted by the UE. For example, the base station may determine the communication service parameter and/or the survival time based at least in part on a quality of service (QoS) associated with the periodic data transmission. A communication service availability parameter may indicate whether a communication system (e.g., a communication link) for communications between the base station and the UE functions as contracted. The UE may be associated with a non-survival state based at least in part on availability criteria for transmitted packets being satisfied. The UE may be associated with a survival state based at least in part on the availability criteria not being satisfied.

For example, the UE may be associated with the survival state based at least in part on a receiving device (e.g., the base station) failing to successfully receive one or more of the periodic data transmissions. In some cases, the UE may be associated with the non-survival state until a quantity of consecutive data transmissions fail to be successfully received by the receiving device. For example, the UE may be configured with a survival time and/or a survival state that is associated with a radio bearer (e.g., a data radio bearer). In other words, the survival time and/or survival state may be configured for a given radio bearer. In some examples, the UE may activate or transition to a survival state based on detecting that a data transmission was not successfully received by the receiving device. For example, the UE may receive an indication of a negative acknowledgement (NACK) associated with the data transmission. In other examples, the UE may determine that the data transmission was not successfully received based on receiving an indication (e.g., DCI) to retransmit the data transmission. For example, the UE may activate or transition to a survival state based on receiving DCI indicating a retransmission for a CG associated with a radio bearer that is configured with a survival time or a survival state.

The UE may remain in the survival state until a data transmission is successfully received by the receiving device. "Survival time" may refer to a maximum period of time that the UE may remain in the survival state. Upon expiration of the survival time, the UE may transition to a down or inactive state in which the UE no longer operates and/or transmits data to the receiving device.

For example, the UE may continue to transmit data to the receiving device while the UE is in the survival state. If the receiving device does not successfully receive a data transmission prior to the expiration of the survival time, the UE may transition to the down or inactive state. To avoid the UE transitioning to the down or inactive state, upon failing to successfully receive a data transmission from the UE, the receiving device (e.g., the base station 110) may transmit a new CG or a CG activation DCI to the UE to increase a reliability of the periodic data transmission. For example, the receiving device may transmit a new CG or a CG activation DCI to the UE to enable the UE to transmit the periodic data transmission via different resources (e.g., a different component carrier, different frequency resources, or different time resources).

However, in some cases, the survival time may be relatively short (e.g., 0.5 ms or 1.0 ms) and may expire prior to the UE receiving the new CG or CG activation DCI, the UE transmitting data via the different resources, and/or the receiving device successfully receiving the data transmission via the different resources.

Some techniques and apparatuses described herein enable different resources to be quickly activated upon a UE entering a survival state without requiring the UE to receive a new CG or CG activation DCI prior to utilizing the different resources.

As indicated above, FIG. 3 is provided as an example. Other examples may differ from what is described with respect to FIG. 3.

Figure 4:
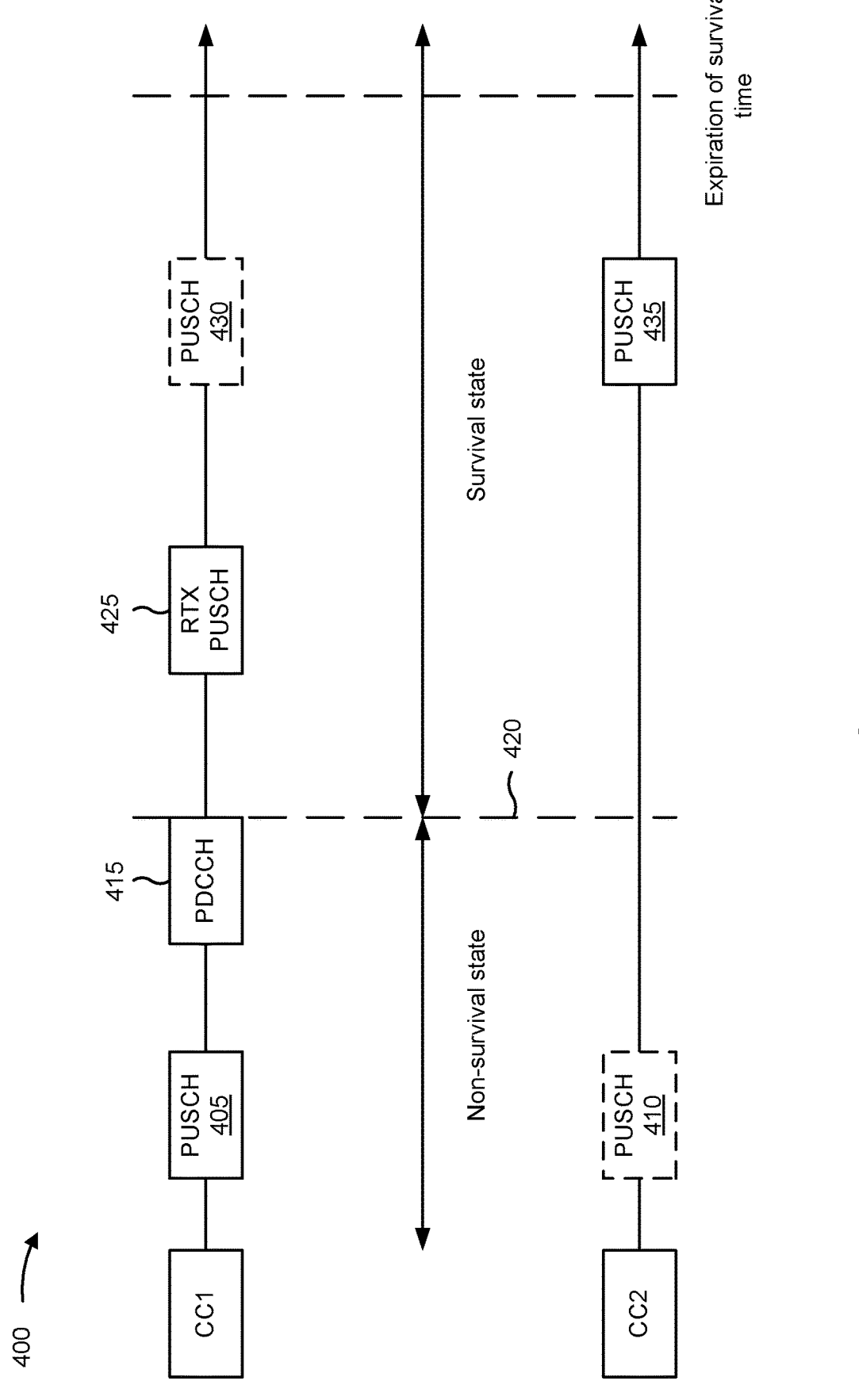
FIGS. 4-7 are diagrams illustrating examples associated with dynamic component carrier configuration for uplink configured grants, in accordance with the present disclosure.

FIG. 4 is a diagram illustrating an example 400 associated with dynamic configuration of component carrier for uplink configured grants, in accordance with the present disclosure. As shown in FIG. 4, example 400 includes communication between a UE 120 and a receiving device (e.g., a base station 110) (not shown). In some aspects, the UE 120 and the receiving device may be included in a wireless network, such as wireless network 100. The UE 120 and the receiving device may communicate via a wireless access link, which may include an uplink and a downlink.

In some aspects, the UE 120 may receive multiple CGs providing overlapping CG opportunities associated with a periodic data transmission. In some aspects, the CG opportunities may overlap in time or frequency, among other examples. For example, as shown in FIG. 4, the UE 120 may receive a CG allocating resources of a first component carrier (e.g., CC1, as shown) and a CG allocating resources of a second component carrier (e.g., CC2, as shown) that overlap in time with the resources of the second component carrier.

In some aspects, the UE 120 may attempt to prioritize the overlapping CG occasions. For example, the UE 120 may select a hybrid automatic repeat request (HARQ) identifier (e.g., a media access control (MAC) packet data unit (PDU)) to be carried by the first component carrier and a HARQ identifier to be carried by the second component carrier based at least in part on a logical channel restriction associated with the first component carrier and/or the second component carrier, HARQ sharing rules, and/or logical channel priorities associated with the first component carrier and the second component carrier. The UE 120 may prioritize the CG opportunity associated with the higher logical channel priority relative to the other CG opportunities.

In some aspects, the CG opportunities have the same logical channel priorities. For example, the data to be transmitted may be included in a periodic data transmission and the UE 120 may select the same HARQ identifier or MAC PDU for each of the overlapping CG opportunities.

The UE 120 may determine a priority of the overlapping CG opportunities based at least in part on a priority rule. The UE 120 may receive the priority rule via DCI or a MAC control element (MAC-CE).

The priority rule may indicate a priority of a CG opportunity relative to the other CG opportunities. For example, the overlapping CG opportunities may include a first CG opportunity and a second CG opportunity. The priority rule may indicate that the first CG opportunity is always prioritized over the second CG opportunity (or that the second CG opportunity is always prioritized over the first CG opportunity).

In some aspects, the priority rule may be a dynamic priority rule. In some aspects, the dynamic priority rule may include a set of priority rules and the UE 120 may determine a priority rule to be utilized based at least in part on one or more conditions being satisfied. For example, the dynamic priority rule may indicate a first priority rule associated with the UE being in a non-survival state and a second priority rule associated with the UE being in a survival state. The first priority rule may indicate that the first component carrier is prioritized over the second component carrier based at least in part on the UE being in the non-survival state. The second priority rule may indicate that the second component carrier is prioritized over the first component carrier based at least in part on the UE being in the survival state.

As shown in FIG. 4, the UE 120 may prioritize the CG opportunity associated with the first component carrier based at least in part on the priority rule indicating that the UE 120 is to prioritize the first CG opportunity over the second CG opportunity when the UE is in the non-survival state. The UE 120 may transmit a PUSCH 405 via resources of the first component carrier (rather than transmit a PUSCH 410 via resources of the second component carrier) based at least in part on prioritizing the first CG opportunity over the second CG opportunity.

In some aspects, the PUSCH 405 may not be successfully received and/or decoded by the receiving device. As shown by reference number 415, the UE 120 may receive a physical downlink control channel (PDCCH) indicating a NACK from the receiving device. In some aspects, the indication of the NACK may include a HARQ NACK. In some aspects, the indication may include DCI allocating resources for retransmitting the PUSCH 405. In such examples, the UE may not receive a HARQ NACK (e.g., and may determine that the PUSCH 405 was not successfully received based on receiving the DCI allocating resources for retransmitting the PUSCH 405).

As shown by reference number 420, the UE 120 may enter a survival state based at least in part on receiving the indication of the NACK. As shown by reference number 425, the UE 120 may retransmit the PUSCH (e.g., via resources of the first component carrier that are indicated by the DCI).

In some aspects, the priority rule may indicate that the first component carrier is always prioritized over the second component carrier (or that the second component carrier is always prioritized over the first component carrier). The UE 120 may transmit a next data transmission of the periodic data transmission (e.g., PUSCH 430, as shown in FIG. 4) via resources of the first component carrier based at least in part on the priority rule indicating that the first component carrier is always prioritized over the second component carrier.

In some aspects, the priority rule may be a dynamic priority rule. The dynamic priority rule may indicate that the first component carrier is prioritized over the second component carrier (or that the second component carrier is prioritized over the first component carrier) when the UE 120 is in the non-survival state and/or that the second component carrier is prioritized over the first component carrier (or that the first component carrier is prioritized over the second component carrier) when the UE 120 is in the survival state. The UE 120 may transmit a next data transmission of the periodic data transmission (e.g., PUSCH 435, as shown in FIG. 4) via resources of the second component carrier based at least in part on the priority rule indicating that the second component carrier is prioritized over the first component carrier when the UE 120 is in the survival state and based at least in part on the UE 120 being in the survival state.

In some aspects, the PUSCH 435 may be successfully received by the receiving device prior to the expiration of the survival time. The UE 120 may transition from the survival state to the non-survival state based at least in part on the PUSCH 435 being successfully received by the receiving device prior to the expiration of the survival time.

In some aspects, the UE 120 may receive an indication of another priority rule for prioritizing the overlapping CG opportunities. The UE 120 may receive the priority rule via DCI or a MAC-CE. The other priority rule may indicate a new, different, or modified priority of the CG opportunities relative to the other CG opportunities. The UE 120 may transmit a remaining portion of the periodic data transmission according to the other priority rule.

As indicated above, FIG. 4 is provided as an example. Other examples may differ from what is described with respect to FIG. 4.

Figure 5:
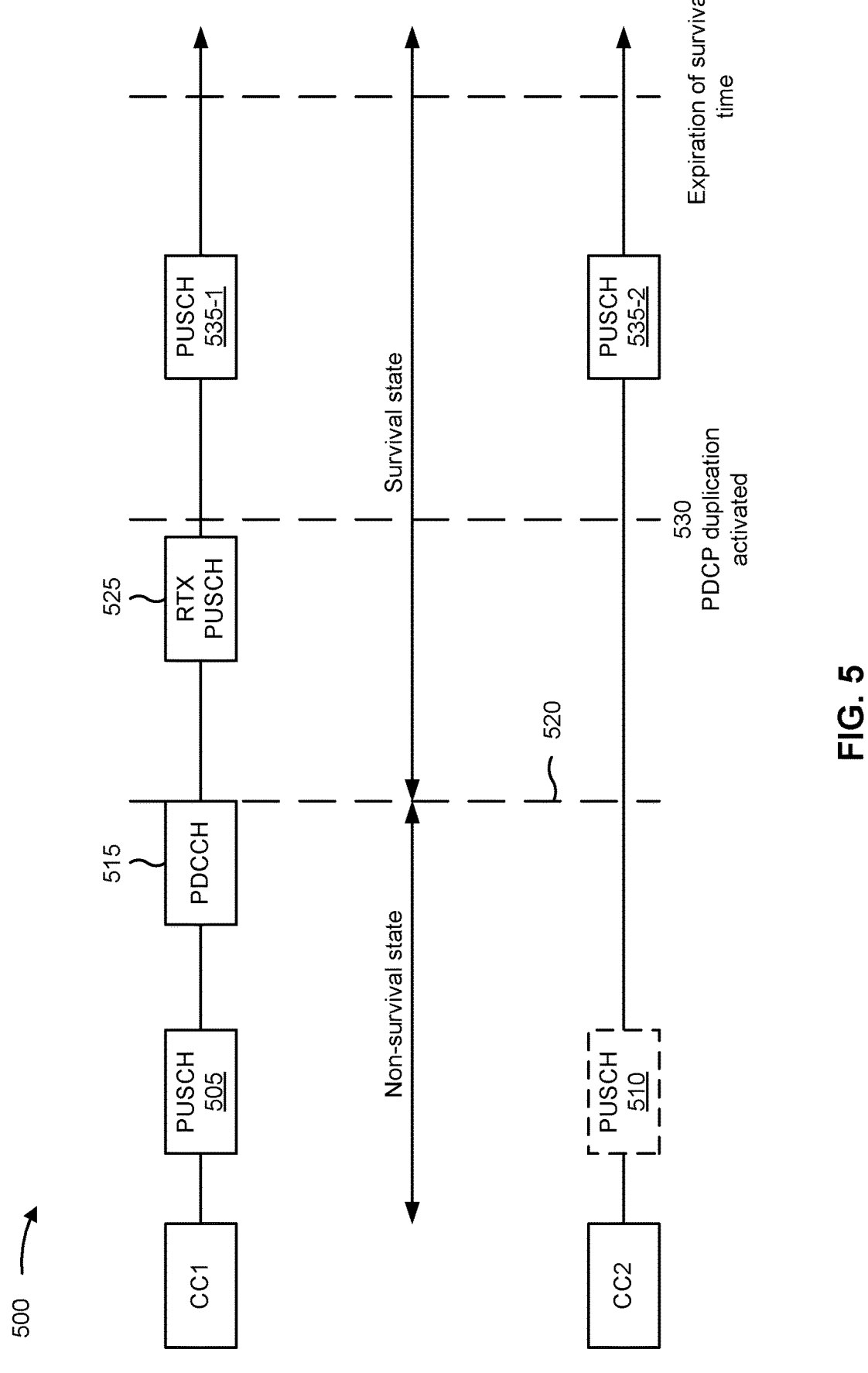

FIG. 5 is a diagram illustrating an example 500 associated with dynamic configuration of component carrier for uplink configured grants, in accordance with the present disclosure. As shown in FIG. 5, example 500 includes communication between a UE 120 and a receiving device (e.g., a base station 110) (not shown). In some aspects, the UE 120 and the receiving device may be included in a wireless network, such as wireless network 100. The UE 120 and the receiving device may communicate via a wireless access link, which may include an uplink and a downlink.

In some aspects, the UE 120 may receive multiple CGs providing overlapping CG opportunities associated with a periodic data transmission. In some aspects, the CG opportunities may overlap in time or frequency, among other examples. For example, as shown in FIG. 5, the UE 120 may receive a CG allocating resources of a first component carrier (e.g., CC1, as shown) and a CG allocating resources of a second component carrier (e.g., CC2, as shown) that overlap in time with the resources of the second component carrier.

In some aspects, the UE 120 may attempt to prioritize the overlapping CG occasions. For example, the UE 120 may select a HARQ identifier to be carried by the first component carrier and a HARQ identifier to be carried by the second component carrier based at least in part on a logical channel restriction associated with the first component carrier and/or the second component carrier, HARQ sharing rules, and/or logical channel priorities associated with the first component carrier and the second component carrier. The UE 120 may prioritize the CG opportunity associated with the higher logical channel priority relative to the other CG opportunities.

In some aspects, the CG opportunities have the same logical channel priorities. For example, the data to be transmitted may be included in a periodic data transmission and the UE 120 may select the same HARQ identifier or MAC PDU for each of the overlapping CG opportunities. The UE 120 may determine a priority of the overlapping CG opportunities based at least in part on a priority rule. The UE 120 may receive an indication of the priority rule via DCI or a MAC-CE.

The priority rule may indicate a priority of a CG opportunity relative to the other CG opportunities. For example, the overlapping CG opportunities may include a first CG opportunity and a second CG opportunity. The priority rule may indicate that the first CG opportunity is always prioritized over the second CG opportunity (or that the second CG opportunity is always prioritized over the first CG opportunity).

In some aspects, the priority rule may be a dynamic priority rule. In some aspects, the dynamic priority rule may include a set of priority rules and the UE 120 may determine a priority rule to be utilized based at least in part on one or more conditions being satisfied. For example, the dynamic priority rule may indicate a first priority rule associated with the UE being in a non-survival state and a second priority rule associated with the UE being in a survival state. The first priority rule may indicate that the first component carrier is prioritized over the second component carrier based at least in part on the UE being in the non-survival state. The second priority rule may indicate that the second component carrier is prioritized over the first component carrier based at least in part on the UE being in the survival state.

In some aspects, an RRC configuration and/or the priority rule may indicate that packet data convergence protocol (PDCP) duplication is activated based at least in part on the UE receiving an indication of a NACK associated with a data transmission of the periodic data transmission (or receiving a DCI scheduling a retransmission of the data transmission). In some aspects, the priority rule may indicate that the CG opportunity associated with the first component carrier is prioritized over the CG opportunity associated with the second component carrier when the UE 120 is in the non-survival state and when the UE 120 is in the survival state. In some aspects, the RRC configuration and/or the priority rule may indicate that the duplicated packet is to be transmitted via the CG opportunity associated with the second component carrier.

As shown in FIG. 5, the UE 120 may prioritize the CG opportunity associated with the first component carrier based at least in part on the priority rule indicating that the UE 120 is to prioritize the first CG opportunity over the second CG opportunity when the UE is in the non-survival state. The UE 120 may transmit a PUSCH 505 via resources of the first component carrier (rather than transmit a PUSCH 510 via resources of the second component carrier) based at least in part on prioritizing the first CG opportunity over the second CG opportunity.

In some aspects, the PUSCH 505 may not be successfully received and/or decoded by the receiving device. As shown by reference number 515, the UE 120 may receive a PDCCH indicating a NACK from the receiving device. In some aspects, the indication of the NACK may include a HARQ NACK. In some aspects, the indication may include DCI allocating resources for retransmitting the PUSCH 505. In such examples, the UE may not receive a HARQ NACK (e.g., and may determine that the PUSCH 505 was not successfully received based on receiving the DCI allocating resources for retransmitting the PUSCH 505).

As shown by reference number 520, the UE 120 may enter a survival state based at least in part on receiving the indication of the NACK. As shown by reference number 525, the UE 120 may retransmit the PUSCH 505 (e.g., via resources of the first component carrier that are indicated by the DCI). As shown by reference number 530, the UE 120 may activate PDCP duplication based at least in part on receiving the NACK.

In some aspects, the priority rule may indicate that the first component carrier is always prioritized over the second component carrier (or that the second component carrier is always prioritized over the first component carrier). The UE 120 may transmit a next data transmission of the periodic data transmission (e.g., PUSCH 535-1, as shown in FIG. 5) via resources of the first component carrier based at least in part on the priority rule indicating that the first component carrier is always prioritized over the second component carrier.

In those aspects, an RRC configuration and/or the priority rule may indicate that PDCP duplication is activated based at least in part on the UE 120 receiving the indication of the NACK and that resources of the second component carrier are utilized for PDCP duplication. The UE 120 may transmit a duplicate of the PUSCH 535-1 (e.g., PUSCH 535-2, as shown in FIG. 5) based at least in part on PDCP duplication being activated. The UE 120 may transmit the duplicate of the PUSCH 535-1 via the second component carrier based at least in part on the RRC configuration and/or the priority rule indicating that the PDCP duplication is to utilize the resources of the second component carrier.

In some aspects, the priority rule may be a dynamic priority rule. The dynamic priority rule may indicate that the first component carrier is prioritized over the second component carrier (or that the second component carrier is prioritized over the first component carrier) when the UE 120 is in the non-survival state and/or that the second component carrier is prioritized over the first component carrier (or that the first component carrier is prioritized over the second component carrier) when the UE 120 is in the survival state. For example, in the survival state, the UE 120 may prioritize the second component carrier in the survival state (e.g., for transmissions of the PUSCH 535-1) and may duplicate transmissions of the PUSCH 535-1 using the first component carrier (e.g., via PDCP duplication).

In some aspects, the PUSCH 535-1 and/or the PUSCH 535-2 may be successfully received by the receiving device prior to the expiration of the survival time. The UE 120 may transition from the survival state to the non-survival state based at least in part on the PUSCH 535-1 and/or the PUSCH 535-2 being successfully received by the receiving device prior to the expiration of the survival time.

In some aspects, the UE 120 may receive an indication of another priority rule for prioritizing the overlapping CG opportunities. The UE 120 may receive the priority rule via DCI or a MAC-CE. The other priority rule may indicate a new, different, or modified priority of the CG opportunities relative to the other CG opportunities. The UE 120 may transmit a remaining portion of the periodic data transmission according to the other priority rule.

As indicated above, FIG. 5 is provided as an example. Other examples may differ from what is described with respect to FIG. 5.

Figure 6:
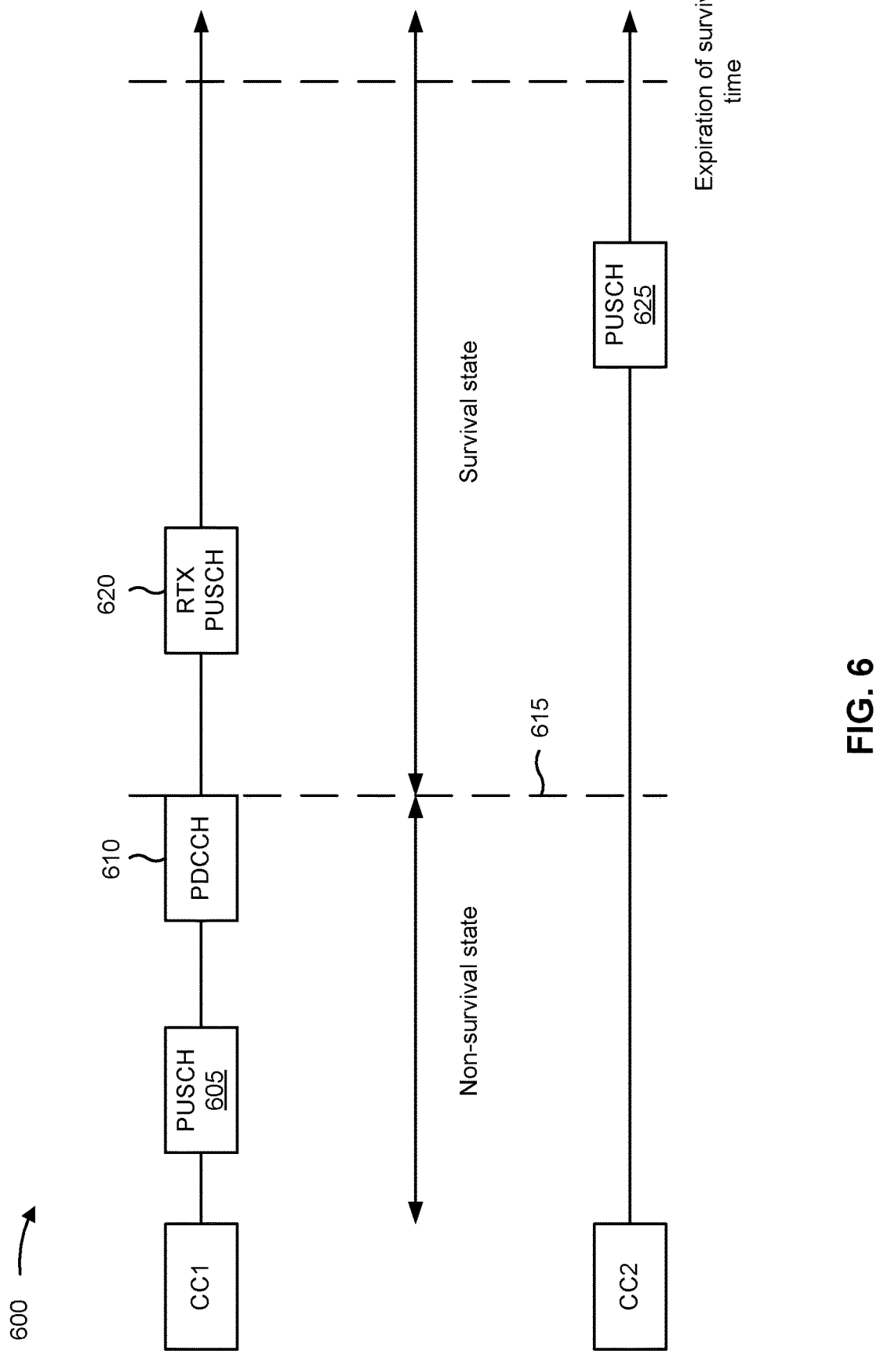

FIG. 6 is a diagram illustrating an example 600 associated with dynamic configuration of component carrier for uplink configured grants, in accordance with the present disclosure. As shown in FIG. 6, example 600 includes communication between a UE 120 and a receiving device (e.g., a base station 110) (not shown). In some aspects, the UE 120 and the receiving device may be included in a wireless network, such as wireless network 100. The UE 120 and the receiving device may communicate via a wireless access link, which may include an uplink and a downlink.

In some aspects, the UE 120 may receive a CG indicating a first set of CG opportunities and a second set of CGs associated with a periodic data transmission. In some aspects, the first set of CG opportunities may be associated with the UE 120 being in a non-survival state and the second set of CG opportunities may be associated with the UE 120 being in a survival state.

For example, the CG may indicate that the UE 120 is to transmit data transmissions of the periodic data transmission via a first set of resources (e.g., a first component carrier (e.g., CC1, as shown in FIG. 6), one or more first time slots, one or more first frequency resources, utilizing one or more first physical (PHY) layer parameters, or utilizing one or more first power control parameters, among other examples) when the UE 120 is in a non-survival state. The CG may indicate that the UE 120 is to transmit data transmissions of the periodic data transmission via a second set of resources (e.g., a second component carrier (e.g., CC2, as shown in FIG. 6), one or more second time slots, one or more second frequency resources, utilizing one or more second PHY layer parameters, or utilizing one or more second power control parameters, among other examples) when the UE 120 is in a survival state.

In some aspects, the first set of resources may be the same as the second set of resources. In some aspects, the one or more of the first set of resources may be different from one or more of the second set of resources.

In some aspects, the CG may indicate that the UE 120 is to transmit the periodic data transmission via the first set of resources (e.g., CC1, as shown) based at least in part on the CG indicating that the UE 120 should utilize the first set of resources when the UE 120 is in the non-survival state. As shown in FIG. 6, the UE 120 may transmit a PUSCH 605 via resources of the first component carrier based at least in part on the CG indicating that the UE 120 should utilize the first set of resources when the UE 120 is in the non-survival state.

In some aspects, the PUSCH 605 may not be successfully received and/or decoded by the receiving device. As shown by reference number 610, the UE 120 may receive a PDCCH indicating a NACK from the receiving device. In some aspects, the indication of the NACK may include a HARQ NACK. In some aspects, the indication may include DCI allocating resources for retransmitting the PUSCH 605.

As shown by reference number 615, the UE 120 may enter a survival state based at least in part on receiving the indication of the NACK. As shown by reference number 620, the UE 120 may retransmit the PUSCH 605 (e.g., via resources of the first component carrier that are indicated by the DCI).

In some aspects, the UE 120 may transmit a next data transmission of the periodic data transmission via the second set of resources based at least in part on the CG indicating that the UE 120 is to utilize the second set of resources when the UE 120 is in the survival state. For example, as shown in FIG. 6, the UE 120 may transmit PUSCH 625 via resources of the second component carrier based at least in part on the CG indicating that the UE 120 is to utilize the second set of resources when the UE 120 is in the survival state and the UE 120 being in the survival state.

In some aspects, the PUSCH 625 may be successfully received by the receiving device prior to the expiration of the survival time. The UE 120 may transition from the survival state to the non-survival state based at least in part on the PUSCH 625 being successfully received by the receiving device prior to the expiration of the survival time.

As indicated above, FIG. 6 is provided as an example. Other examples may differ from what is described with respect to FIG. 6.

Figure 7:
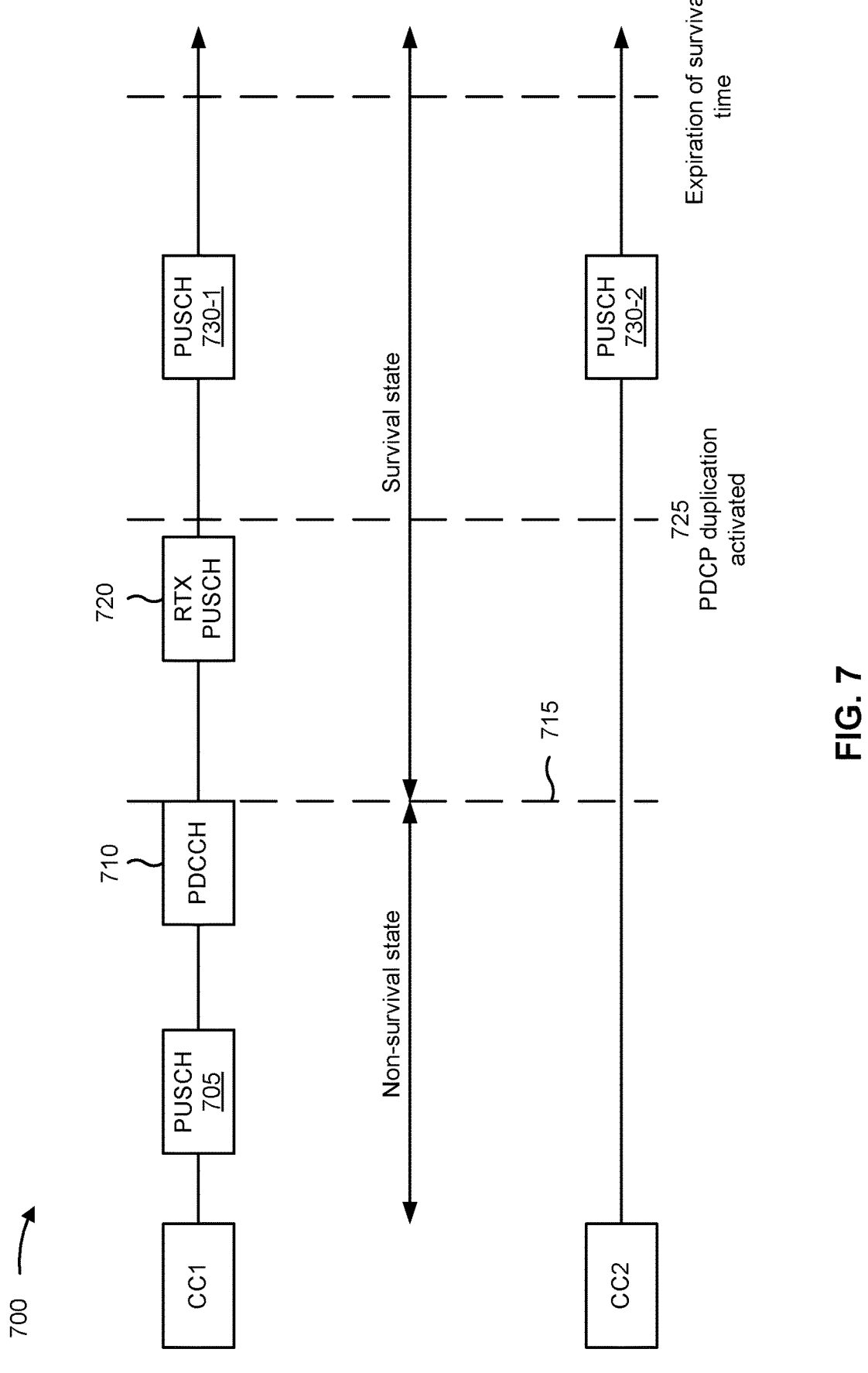

FIG. 7 is a diagram illustrating an example 700 associated with dynamic configuration of component carrier for uplink configured grants, in accordance with the present disclosure. As shown in FIG. 7, example 700 includes communication between a UE 120 and a receiving device (e.g., a base station 110) (not shown). In some aspects, the UE 120 and the receiving device may be included in a wireless network, such as wireless network 100. The UE 120 and the receiving device may communicate via a wireless access link, which may include an uplink and a downlink.

In some aspects, the UE 120 may receive a CG indicating a first set of CG opportunities and a second set of CGs associated with a periodic data transmission. In some aspects, the first set of CG opportunities may be associated with the UE 120 being in a non-survival state and the second set of CG opportunities may be associated with the UE 120 being in a survival state.

For example, the CG may indicate that the UE 120 is to transmit data transmissions of the periodic data transmission via a first set of resources (e.g., a first component carrier (e.g., CC1, as shown in FIG. 7), one or more first time slots, one or more first frequency resources, utilizing one or more first PHY layer parameters, or utilizing one or more first power control parameters, among other examples) when the UE 120 is in a non-survival state.

In some aspects, an RRC configuration and/or the CG may indicate that the UE 120 is to activate PDCP duplication. For example, an RRC configuration and/or the CG may indicate that the UE 120 is to activate PDCP duplication based at least in part on receiving a NACK associated with a data transmission of the periodic data transmission. In some aspects, the RRC configuration and/or the CG may indicate that the PDCP duplication is to utilize a second set of resources (e.g., a second component carrier (e.g., CC2, as shown in FIG. 7), one or more second time slots, one or more second frequency resources, utilizing one or more second PHY layer parameters, or utilizing one or more second power control parameters, among other examples) for the PDCP duplication.

In some aspects, the CG may indicate that the UE 120 is to transmit the periodic data transmission via the first set of resources (e.g., CC1, as shown) when the UE 120 is in the non-survival state and when the UE 120 is in the survival state. As shown in FIG. 7, the UE 120 may transmit a PUSCH 705 via resources of the first component carrier based at least in part on the CG indicating that the UE 120 should utilize the first set of resources when the UE 120 is in the non-survival state and when the UE 120 is in the survival state.

In some aspects, the PUSCH 705 may not be successfully received and/or decoded by the receiving device. As shown by reference number 710, the UE 120 may receive a PDCCH indicating a NACK from the receiving device. In some aspects, the indication of the NACK may include a HARQ NACK. In some aspects, the indication may include DCI allocating resources for retransmitting the PUSCH 705.

As shown by reference number 715, the UE 120 may enter a survival state based at least in part on receiving the indication of the NACK. As shown by reference number 720, the UE 120 may retransmit the PUSCH 705 (e.g., via resources of the first component carrier that are indicated by the DCI).

As shown by reference number 725, the UE 120 may activate PDCP duplication based at least in part on receiving the indication of the NACK.

In some aspects, the UE 120 may transmit a next data transmission of the periodic data transmission via the first set of resources based at least in part on the CG indicating that the UE 120 is to utilize the first set of resources when the UE 120 is in the non-survival state and when the UE 120 is in the survival state. For example, as shown in FIG. 7, the UE 120 may transmit PUSCH 730-1 via resources of the first component carrier based at least in part on the CG indicating that the UE 120 is to utilize the first set of resources when the UE 120 is in the non-survival state and when the UE 120 is in the survival state.

In some aspects, the CG may indicate that PDCP duplication is activated based at least in part on the UE 120 receiving the indication of the NACK and that the PDCP duplication is to utilize the second set of resources. The UE 120 may transmit a duplicate of the PUSCH 730-1 (e.g., PUSCH 730-2, as shown in FIG. 7) based at least in part on PDCP duplication being activated. The UE 120 may transmit the duplicate of the PUSCH 730-1 via the second component carrier based at least in part on the CG indicating that the PDCP duplication is to utilize the second set of resources.

In some aspects, the PUSCH 730-1 and/or the PUSCH 730-2 may be successfully received by the receiving device prior to the expiration of the survival time. The UE 120 may transition from the survival state to the non-survival state based at least in part on the PUSCH 730-1 and/or the PUSCH 730-2 being successfully received by the receiving device prior to the expiration of the survival time.

As indicated above, FIG. 7 is provided as an example. Other examples may differ from what is described with respect to FIG. 7.

FIG. 8 is a diagram illustrating an example process 800 performed, for example, by a UE, in accordance with the present disclosure. Example process 800 is an example where the UE (e.g., UE 120) performs operations associated with dynamic configuration of component carriers for uplink configured grants.

As shown in FIG. 8, in some aspects, process 800 may include receiving an indication of a priority rule for prioritizing overlapping configured grant opportunities associated with a periodic data transmission, wherein the overlapping configured grant opportunities are associated with component carriers having a same logical channel priority, wherein the priority rule indicates a priority of a first component carrier associated with a first configured grant opportunity, of the overlapping configured grant opportunities, relative to a priority of a second component carrier associated with a second configured grant opportunity, of the overlapping configured grant opportunities, based at least in part on whether the UE is associated with a survival state (block 810). For example, the UE (e.g., using communication manager 140 and/or reception component 1002, depicted in FIG. 10) may receive an indication of a priority rule for prioritizing overlapping configured grant opportunities associated with a periodic data transmission, wherein the overlapping configured grant opportunities are associated with component carriers having a same logical channel priority, wherein the priority rule indicates a priority of a first component carrier associated with a first configured grant opportunity, of the overlapping configured grant opportunities, relative to a priority of a second component carrier associated with a second configured grant opportunity, of the overlapping configured grant opportunities, based at least in part on whether the UE is associated with a survival state, as described above.

As further shown in FIG. 8, in some aspects, process 800 may include transmitting the periodic data transmission according to the overlapping configured grant opportunities based at least in part on the priority rule (block 820). For example, the UE (e.g., using communication manager 140 and/or transmission component 1004, depicted in FIG. 10) may transmit the periodic data transmission according to the overlapping configured grant opportunities based at least in part on the priority rule, as described above.

Process 800 may include additional aspects, such as any single aspect or any combination of aspects described below and/or in connection with one or more other processes described elsewhere herein.

In a first aspect, the priority rule indicates that the first component carrier is always prioritized over the second component carrier or that the second component carrier is always prioritized over the first component carrier.

In a second aspect, the indication of the priority rule is received via an RRC configuration.

In a third aspect, the priority rule indicates that the first component carrier is prioritized over the second component carrier when the UE is associated with a non-survival state, and the priority rule indicates that the second component carrier is prioritized over the first component carrier when the UE is associated with a survival state.

In a fourth aspect, transmitting the periodic data transmission according to the overlapping configured grant opportunities based at least in part on the priority rule comprises transmitting a first data transmission, of the periodic data transmission, via one or more resources of the first component carrier based at least in part on the UE being associated with a non-survival state and the priority rule indicating that the first component carrier is prioritized over the second component carrier when the UE is associated with the non-survival state, receiving an indication of a NACK associated with the first data transmission, wherein the UE is associated with the survival state based at least in part on receiving the indication of the NACK, and transmitting a second data transmission, of the periodic data transmission, via one or more resources of the second component carrier based at least in part on the UE being associated with the survival state and the priority rule indicating that the second component carrier is prioritized over the first component carrier when the UE is associated with the survival state.

In a fifth aspect, receiving the indication of the NACK comprises receiving DCI scheduling a retransmission of the first data transmission.

In a sixth aspect, receiving the indication of the NACK comprises receiving a HARQ NACK associated with the first data transmission.

In a seventh aspect, the priority rule indicates that a PDCP duplication is activated based at least in part on the UE receiving an indication of a NACK associated with a data transmission of the periodic data transmission and that the first component carrier is prioritized over the second component carrier when the UE is associated with the survival state and when the UE is associated with a non-survival state.

In an eighth aspect, a next data transmission of the periodic data transmission is transmitted via one or more resources of the first component carrier based at least in part on the priority rule indicating that the first component carrier is prioritized over the second component carrier when the UE is associated with the survival state and when the UE is associated with a non-survival state, and a duplication of the next data transmission is transmitted via one or more resources of the second component carrier based at least in part on PDCP duplication being activated and the UE being associated with the survival state.

In a ninth aspect, process 800 includes receiving an indication of another priority rule for prioritizing the overlapping configured grant opportunities associated with the periodic data transmission, wherein the other priority rule indicates another priority of the first component carrier relative to another priority of the second component carrier based at least in part on whether the UE is associated with the survival state, and transmitting a remaining portion of the periodic data transmission according to the overlapping configured grant opportunities based at least in part on the other priority rule.

In a tenth aspect, the indication of the other priority rule is received via DCI or a MAC-CE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with the present disclosure. Example process 900 is an example where the UE (e.g., UE 120) performs operations associated with dynamic configuration of component carriers for uplink configured grants.

As shown in FIG. 9, in some aspects, process 900 may include receiving a configured grant associated with a periodic data transmission, wherein the configured grant allocates a first set of resources associated with a non-survival state and a second set of resources associated with a survival state (block 910). For example, the UE (e.g., using communication manager 140 and/or reception component 1102, depicted in FIG. 11) may receive a configured grant associated with a periodic data transmission, wherein the configured grant allocates a first set of resources associated with a non-survival state and a second set of resources associated with a survival state, as described above.

As further shown in FIG. 9, in some aspects, process 900 may include transmitting a first data transmission of the periodic data transmission via the first set of resources based at least in part on the UE being associated with the non-survival state (block 920). For example, the UE (e.g., using communication manager 140 and/or transmission component 1104, depicted in FIG. 11) may transmit a first data transmission of the periodic data transmission via the first set of resources based at least in part on the UE being associated with the non-survival state, as described above.

As further shown in FIG. 9, in some aspects, process 900 may include transmitting a second data transmission of the periodic data transmission via the second set of resources based at least in part on the UE being associated with the survival state (block 930). For example, the UE (e.g., using communication manager 140 and/or transmission component 1104, depicted in FIG. 11) may transmit a second data transmission of the periodic data transmission via the second set of resources based at least in part on the UE being associated with the survival state, as described above.

Process 900 may include additional aspects, such as any single aspect or any combination of aspects described below and/or in connection with one or more other processes described elsewhere herein.

In a first aspect, process 900 includes receiving an indication of a NACK associated with the first data transmission, wherein the UE is associated with the survival state based at least in part on receiving the indication of the NACK.

In a second aspect, the indication of the NACK comprises DCI indicating a grant for a retransmission of the first data transmission.

In a third aspect, the indication of the NACK comprises a HARQ NACK associated with the first data transmission.

In a fourth aspect, one or more of the first set of resources includes one or more resources of a first component carrier and the second set of resources includes one or more resources of a second component carrier that is different from the first component carrier, the first set of resources includes one or more first time slots and the second set of resources includes one or more second time slots that are different from the one or more first time slots, the first set of resources includes one or more first frequency resources and the second set of resources includes one or more second frequency resources that are different from the one or more first frequency resources, the first set of resources are associated with one or more first PHY layer parameters and the second set of resources are associated with one or more second PHY parameters that are different from the one or more first PHY parameters, or the first set of resources are associated with one or more first power control parameters and the second set of resources are associated with one or more second power control parameters that are different from the one or more first power control parameters.

In a fifth aspect, another set of resources and PDCP duplication are activated based at least in part on the UE being associated with the survival state.

In a sixth aspect, the PDCP duplication is RRC configured.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
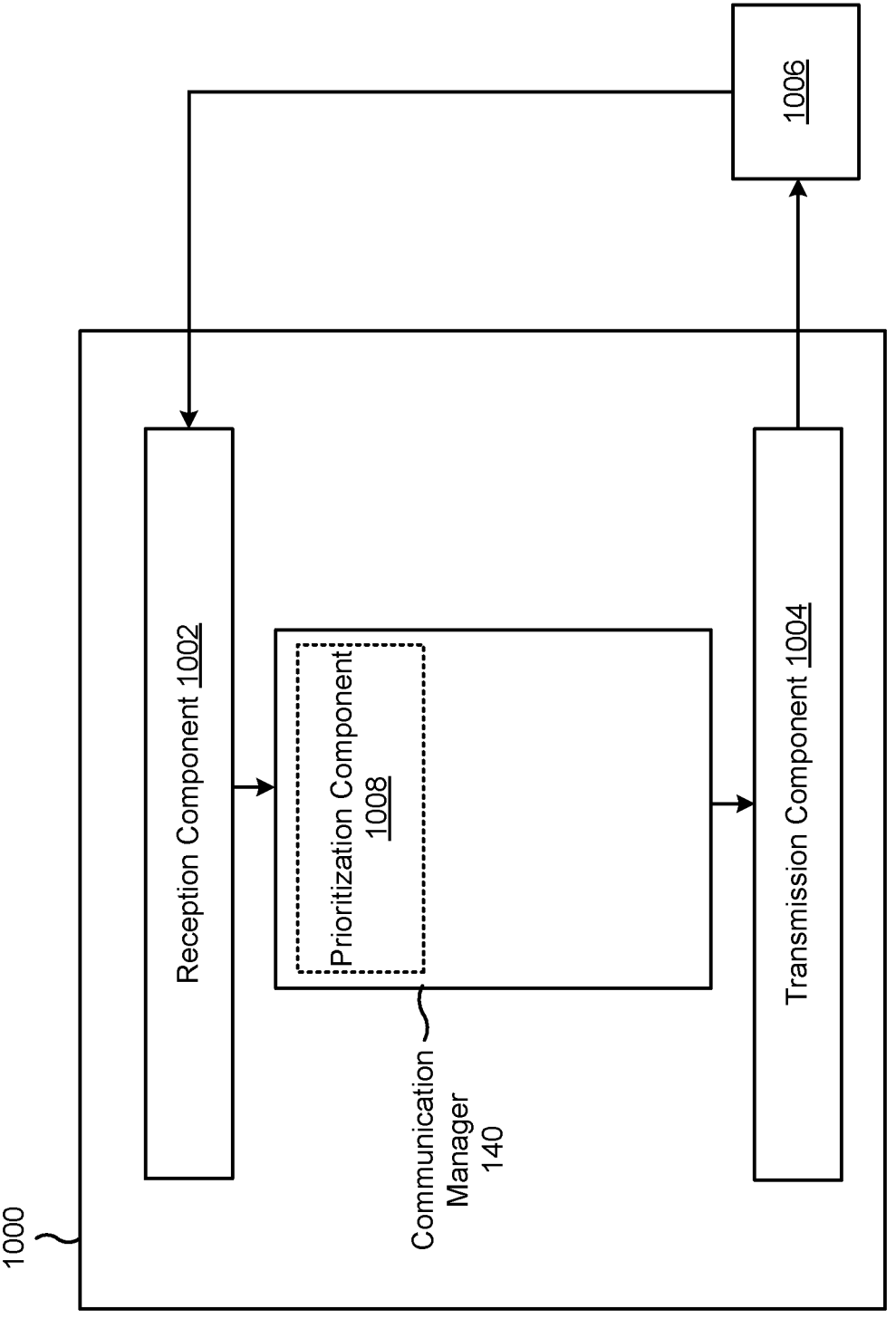
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a prioritization component 1008, among other examples.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive an indication of a priority rule for prioritizing overlapping configured grant opportunities associated with a periodic data transmission, wherein the overlapping configured grant opportunities are associated with component carriers having a same logical channel priority. The prioritization component 1008 may determine that the priority rule indicates a priority of a first component carrier associated with a first configured grant opportunity, of the overlapping configured grant opportunities, relative to a priority of a second component carrier associated with a second configured grant opportunity, of the overlapping configured grant opportunities, based at least in part on whether the UE is associated with a survival state. The transmission component 1004 may transmit the periodic data transmission according to the overlapping configured grant opportunities based at least in part on the priority rule.

The reception component 1002 may receive an indication of another priority rule for prioritizing the overlapping configured grant opportunities associated with the periodic data transmission, wherein the other priority rule indicates another priority of the first component carrier relative to another priority of the second component carrier based at least in part on whether the UE is associated with the survival state.

The transmission component 1004 may transmit a remaining portion of the periodic data transmission according to the overlapping configured grant opportunities based at least in part on the other priority rule.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
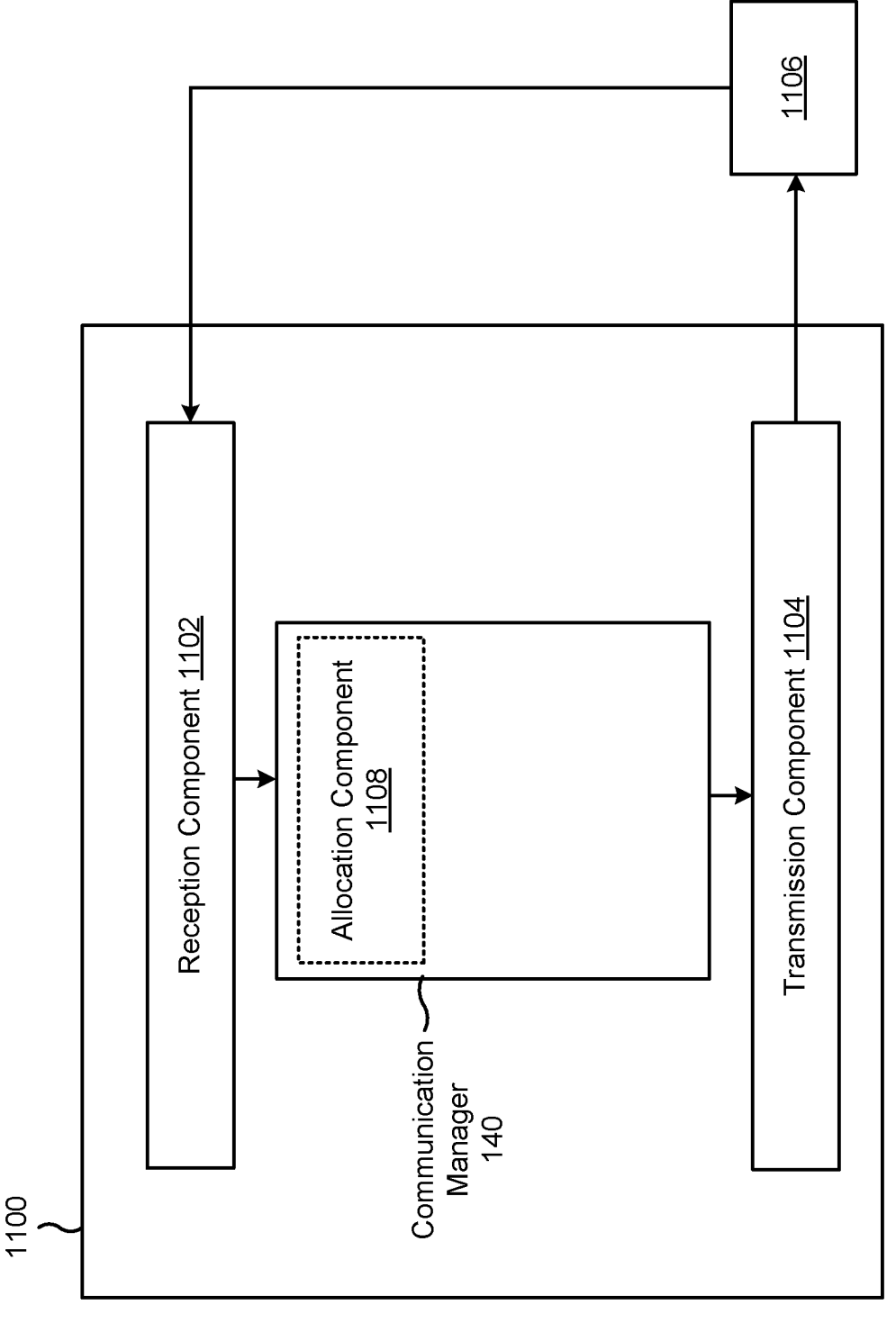

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include an allocation component 1108, among other examples.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive a configured grant associated with a periodic data transmission. The allocation component 1108 may determine that the configured grant allocates a first set of resources associated with a non-survival state and a second set of resources associated with a survival state. The transmission component 1104 may transmit a first data transmission of the periodic data transmission via the first set of resources based at least in part on the UE being associated with the non-survival state. The transmission component 1104 may transmit a second data transmission of the periodic data transmission via the second set of resources based at least in part on the UE being associated with the survival state.

The reception component 1102 may receive an indication of a NACK associated with the first data transmission, wherein the UE is associated with the survival state based at least in part on receiving the indication of the NACK.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving an indication of a priority rule for prioritizing overlapping configured grant opportunities associated with a periodic data transmission, wherein the overlapping configured grant opportunities are associated with component carriers having a same logical channel priority, wherein the priority rule indicates a priority of a first component carrier associated with a first configured grant opportunity, of the overlapping configured grant opportunities, relative to a priority of a second component carrier associated with a second configured grant opportunity, of the overlapping configured grant opportunities, based at least in part on whether the UE is associated with a survival state; and transmitting the periodic data transmission according to the overlapping configured grant opportunities based at least in part on the priority rule.

Aspect 2: The method of Aspect 1, wherein the priority rule indicates that the first component carrier is always prioritized over the second component carrier or that the second component carrier is prioritized over the first component carrier.

Aspect 3: The method of one or more of Aspects 1 and 2, wherein the indication of the priority rule is received via an RRC configuration.

Aspect 4: The method of one or more of Aspects 1 through 3, wherein the priority rule indicates that the first component carrier is prioritized over the second component carrier when the UE is associated with a non-survival state, and wherein the priority rule indicates that the second component carrier is prioritized over the first component carrier when the UE is associated with a survival state.

Aspect 5: The method of one or more of Aspects 1 through 4, wherein transmitting the periodic data transmission according to the overlapping configured grant opportunities based at least in part on the priority rule comprises: transmitting a first data transmission, of the periodic data transmission, via one or more resources of the first component carrier based at least in part on the UE being associated with a non-survival state and the priority rule indicating that the first component carrier is prioritized over the second component carrier when the UE is associated with the non-survival state; receiving an indication of a NACK associated with the first data transmission, wherein the UE is associated with the survival state based at least in part on receiving the indication of the NACK; and transmitting a second data transmission, of the periodic data transmission, via one or more resources of the second component carrier based at least in part on the UE being associated with the survival state and the priority rule indicating that the second component carrier is prioritized over the first component carrier when the UE is associated with the survival state.

Aspect 6: The method of Aspect 5, wherein receiving the indication of the NACK comprises: receiving DCI scheduling a retransmission of the first data transmission.

Aspect 7: The method of Aspect 5, wherein receiving the indication of the NACK comprises: receiving a HARQ NACK associated with the first data transmission.

Aspect 8: The method of one or more of Aspects 1 through 7, wherein the priority rule indicates that a PDCP duplication is activated based at least in part on receiving an indication of a NACK associated with a data transmission of the periodic data transmission and that the first component carrier is prioritized over the second component carrier when the UE is associated with the survival state and when the UE is associated with a non-survival state.

Aspect 9: The method of Aspect 8, wherein a next data transmission of the periodic data transmission is transmitted via one or more resources of the first component carrier based at least in part on the priority rule indicating that the first component carrier is prioritized over the second component carrier when the UE is associated with the survival state and when the UE is associated with a non-survival state; and wherein a duplication of the next data transmission is transmitted via one or more resources of the second component carrier based at least in part on PDCP duplication being activated and the UE being associated with the survival state.

Aspect 10: The method of one or more of Aspects 1 through 9, further comprising: receiving an indication of another priority rule for prioritizing the overlapping configured grant opportunities associated with the periodic data transmission, wherein the other priority rule indicates another priority of the first component carrier relative to another priority of the second component carrier based at least in part on whether the UE is associated with the survival state; and transmitting a remaining portion of the periodic data transmission according to the overlapping configured grant opportunities based at least in part on the other priority rule.

Aspect 11: The method of Aspect 10, wherein the indication of the other priority rule is received via DCI or a MAC-CE.

Aspect 12: A method of wireless communication performed by a UE, comprising: receiving a configured grant associated with a periodic data transmission, wherein the configured grant allocates a first set of resources associated with a non-survival state and a second set of resources associated with a survival state; transmitting a first data transmission of the periodic data transmission via the first set of resources based at least in part on the UE being associated with the non-survival state; and transmitting a second data transmission of the periodic data transmission via the second set of resources based at least in part on the UE being associated with the survival state.

Aspect 13: The method of Aspect 12, further comprising: receiving an indication of a NACK associated with the first data transmission, wherein the UE is associated with the survival state based at least in part on receiving the indication of the NACK.

Aspect 14: The method of Aspect 13, wherein the indication of the NACK comprises DCI indicating a grant for a retransmission of the first data transmission.

Aspect 15: The method of Aspect 13, wherein the indication of the NACK comprises a HARQ NACK associated with the first data transmission.

Aspect 16: The method of one or more of Aspects 12 through 15, wherein one or more of: the first set of resources includes one or more resources of a first component carrier and the second set of resources includes one or more resources of a second component carrier that is different from the first component carrier, the first set of resources includes one or more first time slots and the second set of resources includes one or more second time slots that are different from the one or more first time slots, the first set of resources includes one or more first frequency resources and the second set of resources includes one or more second frequency resources that are different from the one or more first frequency resources, the first set of resources are associated with one or more first PHY layer parameters and the second set of resources are associated with one or more second PHY parameters that are different from the one or more first PHY parameters, or the first set of resources are associated with one or more first power control parameters and the second set of resources are associated with one or more second power control parameters that are different from the one or more first power control parameters.

Aspect 17: The method of one or more of Aspects 12 through 15, wherein another set of resources and PDCP duplication is activated based at least in part on the UE being associated with the survival state.

Aspect 18: The method of Aspect 17, wherein the PDCP duplication is RRC configured.

Aspect 19: An apparatus for wireless communication at a device, comprising a processor; memory coupled with the processor; and instructions stored in the memory and executable by the processor to cause the apparatus to perform the method of one or more of Aspects 1 through 11.

Aspect 20: A device for wireless communication, comprising a memory and one or more processors coupled to the memory, the one or more processors configured to perform the method of one or more of Aspects 1 through 11.

Aspect 21: An apparatus for wireless communication, comprising at least one means for performing the method of one or more of Aspects 1 through 11.

Aspect 22: A non-transitory computer-readable medium storing code for wireless communication, the code comprising instructions executable by a processor to perform the method of one or more of Aspects 1 through 11.

Aspect 23: A non-transitory computer-readable medium storing a set of instructions for wireless communication, the set of instructions comprising one or more instructions that, when executed by one or more processors of a device, cause the device to perform the method of one or more of Aspects 1 through 11.

Aspect 24: An apparatus for wireless communication at a device, comprising a processor; memory coupled with the processor; and instructions stored in the memory and executable by the processor to cause the apparatus to perform the method of one or more of Aspects 12 through 18.

Aspect 25: A device for wireless communication, comprising a memory and one or more processors coupled to the memory, the one or more processors configured to perform the method of one or more of Aspects 12 through 18.

Aspect 26: An apparatus for wireless communication, comprising at least one means for performing the method of one or more of Aspects 12 through 18.

Aspect 27: A non-transitory computer-readable medium storing code for wireless communication, the code comprising instructions executable by a processor to perform the method of one or more of Aspects 12 through 18.

Aspect 28: A non-transitory computer-readable medium storing a set of instructions for wireless communication, the set of instructions comprising one or more instructions that, when executed by one or more processors of a device, cause the device to perform the method of one or more of Aspects 12 through 18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, wherein the one or more processors are configured to:

receive an indication of a first priority rule for prioritizing configured grant opportunities associated with a periodic data transmission, wherein:

the configured grant opportunities overlap in a time domain and are associated with component carriers having a same logical channel priority;

the first priority rule indicates a first priority of a first component carrier associated with a first configured grant opportunity, of the configured grant opportunities, relative to a second priority of a second component carrier associated with a second configured grant opportunity, of the configured grant opportunities; and the first priority rule is based on whether the UE is associated with a survival state, and wherein the survival state is associated with an unsuccessful reception of the periodic data transmission;

receive an indication of a second priority rule for prioritizing the configured grant opportunities associated with the periodic data transmission, wherein the second priority rule indicates a third priority of the first component carrier relative to a fourth priority of the second component carrier based on whether the UE is associated with the survival state;

transmit the periodic data transmission using at least one of the first configured grant opportunity or the second configured grant opportunity based on the first priority rule; and transmit a remaining portion of the periodic data transmission according to the configured grant opportunities based on the second priority rule.

2. The UE of claim 1, wherein the first priority rule indicates that the first component carrier is always prioritized over the second component carrier or that the second component carrier is always prioritized over the first component carrier.

3. The UE of claim 1, wherein the indication of the first priority rule is received via a radio resource control (RRC) configuration.

4. The UE of claim 1, wherein the first priority rule indicates that the first component carrier is prioritized over the second component carrier based on the UE being associated with a non-survival state, and wherein the first priority rule indicates that the second component carrier is prioritized over the first component carrier based on the UE being associated with the survival state.

5. The UE of claim 1, wherein the one or more processors, to transmit the periodic data transmission according to the configured grant opportunities based on the first priority rule, are configured to:

transmit a first data transmission, of the periodic data transmission, via one or more resources of the first component carrier based on the UE being associated with a non-survival state and the first priority rule indicating that the first component carrier is prioritized over the second component carrier based on the UE being associated with the non-survival state;

receive an indication of a negative acknowledgement (NACK) associated with the first data transmission, wherein the UE is associated with the survival state based on receiving the indication of the NACK; and transmit a second data transmission, of the periodic data transmission, via one or more resources of the second component carrier based on the UE being associated with the survival state and the first priority rule indicating that the second component carrier is prioritized over the first component carrier based on the UE being associated with the survival state.

6. The UE of claim 5, wherein the one or more processors, to receive the indication of the NACK, are configured to:

receive downlink control information (DCI) scheduling a retransmission of the first data transmission; or receive a hybrid automatic repeat request (HARQ) NACK associated with the first data transmission.

7. The UE of claim 1, wherein the first priority rule indicates that packet data convergence protocol (PDCP) duplication is activated based on receiving an indication of a negative acknowledgement (NACK) associated with a data transmission of the periodic data transmission.

8. The UE of claim 7, wherein a next data transmission of the periodic data transmission is transmitted via one or more resources of the first component carrier based on the first priority rule indicating that the first component carrier is prioritized over the second component carrier; and wherein a duplication of the next data transmission is transmitted via one or more resources of the second component carrier based on PDCP duplication being activated.

9. The UE of claim 1, wherein the indication of the second priority rule is received via downlink control information (DCI) or a media access control (MAC) control element (MAC-CE).

10. A UE for wireless communication, comprising:

a memory; and one or more processors, coupled to the memory, wherein the one or more processors are configured to:

receive a configured grant associated with a periodic data transmission, wherein the configured grant allocates a first set of resources associated with a non-survival state and a second set of resources associated with a survival state, wherein the non-survival state and the survival state are based on whether data transmissions associated with the configured grant have been successfully received, and wherein one or more of:

the first set of resources includes one or more resources of a first component carrier and the second set of resources includes one or more resources of a second component carrier that is different from the first component carrier, the first set of resources includes one or more first time slots and the second set of resources includes one or more second time slots that are different from the one or more first time slots, the first set of resources includes one or more first frequency resources and the second set of resources includes one or more second frequency resources that are different from the one or more first frequency resources, the first set of resources are associated with one or more first physical (PHY) layer parameters and the second set of resources are associated with one or more second PHY parameters that are different from the one or more first PHY parameters, or the first set of resources are associated with one or more first power control parameters and the second set of resources are associated with one or more second power control parameters that are different from the one or more first power control parameters;

transmit a first data transmission of the periodic data transmission via the first set of resources based on the UE being associated with the non-survival state; and transmit a second data transmission of the periodic data transmission via the second set of resources based on the UE being associated with the survival state.

11. The UE of claim 10, wherein the one or more processors are configured to:

receive an indication of a negative acknowledgement (NACK) associated with the first data transmission, wherein the UE is associated with the survival state based on receiving the indication of the NACK.

12. The UE of claim 11, wherein the indication of the NACK comprises downlink control information (DCI) indicating a grant for a retransmission of the first data transmission.

13. The UE of claim 11, wherein the indication of the NACK comprises a hybrid automatic repeat request (HARQ) NACK associated with the first data transmission.

14. The UE of claim 10, wherein another set of resources and packet data convergence protocol (PDCP) duplication is activated based on the UE being associated with the survival state.

15. The UE of claim 14, wherein the PDCP duplication is radio resource control (RRC) configured.

16. A user equipment (UE) for wireless communication, comprising:

a memory; and one or more processors, coupled to the memory, wherein the one or more processors are configured to:

receive an indication of a priority rule for prioritizing configured grant opportunities associated with a periodic data transmission, wherein:

the configured grant opportunities overlap in a time domain and are associated with component carriers having a same logical channel priority;

the priority rule indicates a first priority of a first component carrier associated with a first configured grant opportunity, of the configured grant opportunities, relative to a second priority of a second component carrier associated with a second configured grant opportunity, of the configured grant opportunities;

the priority rule indicates that the first component carrier is prioritized over the second component carrier based on the UE being associated with a non-survival state;

the priority rule indicates that the second component carrier is prioritized over the first component carrier based on the UE being associated with a survival state; and the survival state is associated with an unsuccessful reception of the periodic data transmission; and transmit the periodic data transmission using at least one of the first configured grant opportunity or the second configured grant opportunity based the priority rule.

17. The UE of claim 16, wherein the indication of the priority rule is received via a radio resource control (RRC) configuration.

18. The UE of claim 16, wherein the one or more processors, to transmit the periodic data transmission according to the configured grant opportunities based on the priority rule, are configured to:

transmit a first data transmission, of the periodic data transmission, via one or more resources of the first component carrier based on the UE being associated with a non-survival state and the priority rule indicating that the first component carrier is prioritized over the second component carrier based on the UE being associated with the non-survival state;

receive an indication of a negative acknowledgement (NACK) associated with the first data transmission, wherein the UE is associated with the survival state based on receiving the indication of the NACK; and transmit a second data transmission, of the periodic data transmission, via one or more resources of the second component carrier based on the UE being associated with the survival state and the priority rule indicating that the second component carrier is prioritized over the first component carrier based on the UE being associated with the survival state.

19. The UE of claim 16, wherein the priority rule indicates that packet data convergence protocol (PDCP) duplication is activated based on receiving an indication of a negative acknowledgement (NACK) associated with a data transmission of the periodic data transmission.

20. The UE of claim 19, wherein a next data transmission of the periodic data transmission is transmitted via one or more resources of the first component carrier based on the priority rule indicating that the first component carrier is prioritized over the second component carrier; and wherein a duplication of the next data transmission is transmitted via one or more resources of the second component carrier based on PDCP duplication being activated.

21. The UE of claim 16, wherein the one or more processors are further configured to:

receive an indication of another priority rule for prioritizing the configured grant opportunities associated with the periodic data transmission, wherein the other priority rule indicates another priority of the first component carrier relative to another priority of the second component carrier based on whether the UE is associated with the survival state; and transmit a remaining portion of the periodic data transmission according to the configured grant opportunities based on the other priority rule.

22. A user equipment (UE) for wireless communication, comprising:

a memory; and one or more processors, coupled to the memory, wherein the one or more processors are configured to:

receive an indication of a priority rule for prioritizing configured grant opportunities associated with a periodic data transmission, wherein:

the configured grant opportunities overlap in a time domain and are associated with component carriers having a same logical channel priority;

the priority rule indicates a first priority of a first component carrier associated with a first configured grant opportunity, of the configured grant opportunities, relative to a second priority of a second component carrier associated with a second configured grant opportunity, of the configured grant opportunities;

the priority rule is based on whether the UE is associated with a survival state; and the survival state is associated with an unsuccessful reception of the periodic data transmission;

transmit a first data transmission, of the periodic data transmission, via one or more resources of the first component carrier based on the UE being associated with a non-survival state and the priority rule indicating that the first component carrier is prioritized over the second component carrier based on the UE being associated with the non-survival state;

receive an indication of a negative acknowledgement (NACK) associated with the first data transmission, wherein the UE is associated with the survival state based on receiving the indication of the NACK; and transmit a second data transmission, of the periodic data transmission, via one or more resources of the second component carrier based on the UE being associated with the survival state and the priority rule indicating that the second component carrier is prioritized over the first component carrier based on the UE being associated with the survival state.

23. The UE of claim 22, wherein the one or more processors, to receive the indication of the NACK, are configured to:

receive downlink control information (DCI) scheduling a retransmission of the first data transmission; or receive a hybrid automatic repeat request (HARQ) NACK associated with the first data transmission.

24. The UE of claim 22, wherein the priority rule indicates that the first component carrier is always prioritized over the second component carrier or that the second component carrier is always prioritized over the first component carrier.

25. The UE of claim 22, wherein the indication of the priority rule is received via a radio resource control (RRC) configuration.

26. The UE of claim 22, wherein the priority rule indicates that the first component carrier is prioritized over the second component carrier based on the UE being associated with a non-survival state, and wherein the priority rule indicates that the second component carrier is prioritized over the first component carrier based on the UE being associated with the survival state.

27. The UE of claim 22, wherein the one or more processors, to transmit the periodic data transmission according to the configured grant opportunities based on the priority rule, are configured to:

transmit a first data transmission, of the periodic data transmission, via one or more resources of the first component carrier based on the UE being associated with a non-survival state and the priority rule indicating that the first component carrier is prioritized over the second component carrier based on the UE being associated with the non-survival state;

receive an indication of a negative acknowledgement (NACK) associated with the first data transmission, wherein the UE is associated with the survival state based on receiving the indication of the NACK; and transmit a second data transmission, of the periodic data transmission, via one or more resources of the second component carrier based on the UE being associated with the survival state and the priority rule indicating that the second component carrier is prioritized over the first component carrier based on the UE being associated with the survival state.

28. The UE of claim 27, wherein the one or more processors, to receive the indication of the NACK, are configured to:

receive downlink control information (DCI) scheduling a retransmission of the first data transmission; or receive a hybrid automatic repeat request (HARQ) NACK associated with the first data transmission.

29. The UE of claim 22, wherein the priority rule indicates that packet data convergence protocol (PDCP) duplication is activated based on receiving an indication of a negative acknowledgement (NACK) associated with a data transmission of the periodic data transmission.

30. The UE of claim 22, wherein the one or more processors are further configured to:

receive an indication of another priority rule for prioritizing the configured grant opportunities associated with the periodic data transmission, wherein the other priority rule indicates another priority of the first component carrier relative to another priority of the second component carrier based on whether the UE is associated with the survival state; and transmit a remaining portion of the periodic data transmission according to the configured grant opportunities based on the other priority rule.

* * * * *